J. H. WRIGHT.
AUTOMOBILE PULLER.
APPLICATION FILED JAN. 27, 1920.

1,394,703.

Patented Oct. 25, 1921.

WITNESSES
Guy M. Spring
J. P. Campbell

Inventor
JOSEPH H. WRIGHT

By Richard B. Owen
Attorney

UNITED STATES PATENT OFFICE.

JOSEPH H. WRIGHT, OF HENDERSON, TEXAS.

AUTOMOBILE-PULLER.

1,394,703.  Specification of Letters Patent.  Patented Oct. 25, 1921.

Application filed January 27, 1920. Serial No. 354,376.

*To all whom it may concern:*

Be it known that I, JOSEPH H. WRIGHT, a citizen of the United States, residing at Henderson, in the county of Rusk and State of Texas, have invented certain new and useful Improvements in an Automobile-Puller, of which the following is a specification.

My invention relates to new and useful improvements in an automobile attachment and more particularly to an automobile puller.

The principal object of the invention is the provision of a device adapted to be secured on the hub of the wheel for pulling the automobile out of mud or sand where the wheel would ordinarily spin without propelling the vehicle.

Another object of the invention resides in the construction of the device in such a manner that it may be screwed upon the hub of the wheel after removing the ordinary hub cap.

Still another object consists in the provision of a rope or cable so constructed that one end may be secured to the automobile wheel and the other end to a stake or other suitable object.

With these and other objects in view my invention consists in the novel details of construction and arrangement of parts which will be more clearly understood from the following specification and drawings in which:—

Figure 1:
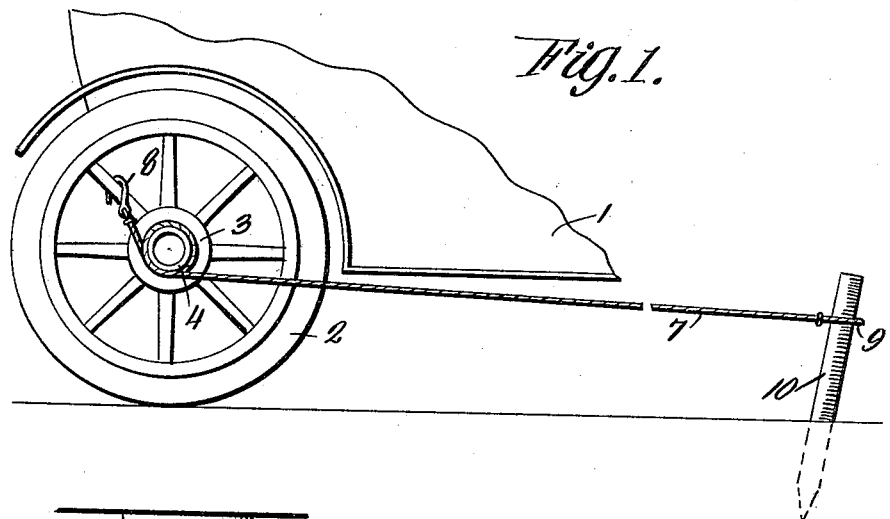
Figure 1 is a side elevation showing my device in position ready for use.
Figure 2:
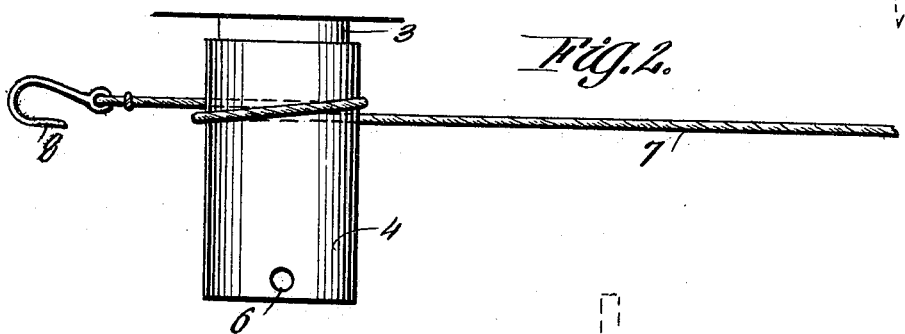
Fig. 2 is a top plan.

In the drawings the numeral 1 indicates the automobile body which may be of usual construction and 2 indicates the rear wheel of the automobile constructed with the usual hub 3. As is well known the hubs of automobile wheels now commonly in use are exteriorly threaded to receive an interiorly threaded hub cap. My attachment, adapted to be used for pulling the automobile out of mud, sand, or other places where the wheel spins instead of propelling the vehicle, is adapted to be secured to the exteriorly threaded portion of the hub after the hub cap has been removed.

Figure 3:
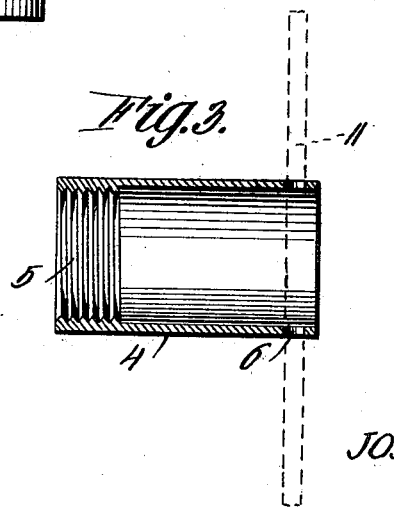
Fig. 3 is a longitudinal section through the sleeve adapted to be secured to the wheel hub.

My attachment comprises a sleeve 4 open at each end as clearly shown in Fig. 3 of the drawings. The sleeve is interiorly threaded, adjacent one end, as indicated at 5, and is provided adjacent the opposite end with alining openings 6 for a purpose to be later described. The threads 5 are adapted to engage the threads on the hub 3 when the device is to be used.

In connection with the sleeve 4 I use a rope or cable 7. This rope or cable 7 is provided on one end with a hook 8 which is adapted to be engaged with one of the wheel spokes as clearly shown in Fig. 1 of the drawings. The opposite end of the rope or cable 7 is looped to form an eye 9 which is adapted to be placed over the top of a stake 10 or other suitable member driven into the ground. While I have described the rope or cable as being looped to form the eye it will be understood that I might make the rope or cable straight on the end and then tie it around the stake or other objects when desired. For applying or detaching the sleeve 4 a rod 11 may be passed through the alining openings 6 and can be grasped by the hand for turning the sleeve.

From the above detailed description it is thought that the advantages as well as the manner of using my device will be clearly understood. As stated in the objects of the invention it is my purpose to provide a device which may be easily connected to the hub of a wheel for pulling the automobile out of mud, sand, or other places where the wheel spins instead of propelling the vehicle. When it is desired to use the device the usual hub cap is removed and the sleeve 4 is threaded upon the hub by having the threads 5 engaging the exterior threads on the hub. As above stated a rod 11 may be passed through the alining openings 6 for rotating the sleeve. The rope or cable 7 is first passed under the sleeve, and if desired may be given one wrapping, and the hook 8 is engaged with one of the wheel spokes. The stake 10 is driven into the ground and the eye 9 placed thereover as more clearly illustrated in Fig. 1 of the drawings. When this has been done the engine is then started and the operation of the wheel 2 will wrap the cable or rope 7 upon the sleeve 4 and the automobile will thus be pulled from the mud. While I have described the use of a stake 10 it will be understood that the end of the rope or cable might equally as well be connected to a tree or other suitable object.

It will be noted that I have provided a device which is simple and inexpensive in construction and which may be readily carried in the automobile when not in use or which may be readily applied when desired. At the same time, if desired, the sleeve might be left permanently upon the wheel to be used as desired.

The foregoing description and the accompanying drawings have reference to what might be considered the approved, or preferred, form of my invention. I desire it to be understood that I may make such changes in construction, combination and arrangement of parts, materials, dimensions, etc., as may prove expedient and fall within the scope of the appended claim.

Having fully described my invention what I claim as new and desire to secure for Letters Patent is:—

In combination with an automobile wheel having an exteriorly threaded hub, an interiorly threaded sleeve adapted to be received upon the hub, said sleeve having alining openings adjacent one end, a cable adapted to be wound upon the sleeve, a hook secured to one end of the cable and adapted to engage one of the wheel spokes, and a rod adapted to pass through the alining openings of the sleeve for rotating the same.

In testimony whereof I affix my signature in the presence of two witnesses.

JOSEPH H. WRIGHT.

Witnesses:
  CHAS. T. ANGLE,
  J. E. ARNOLD.